United States Patent [19]
Georges

[11] Patent Number: 5,241,461
[45] Date of Patent: Aug. 31, 1993

[54] COMPUTERIZED DYNAMIC DISPLACEMENT DISPLAY CONTROL SYSTEMS

[76] Inventor: Bradford J. Georges, Newbridge House, School Road, Upwell, Norfolk, England

[21] Appl. No.: 879,138

[22] Filed: May 5, 1992

Related U.S. Application Data

[63] Continuation of Ser. No. 456,610, Dec. 21, 1989, abandoned, which is a continuation of Ser. No. 139,017, Dec. 29, 1987, abandoned, which is a continuation-in-part of Ser. No. 755,573, Jul. 16, 1985, abandoned.

[30] Foreign Application Priority Data

Jul. 20, 1984 [GB] United Kingdom ................ 8418504

[51] Int. Cl.$^5$ ............................................. G06F 15/46
[52] U.S. Cl. .................................... 364/148; 364/152; 364/188; 364/578; 376/245; 395/140
[58] Field of Search ............... 364/148, 152, 153, 154, 364/156, 164, 400, 401, 408, 734, 578, 492–495, 188, 189, 184–187; 376/245, 277; 434/118, 218, 219, 366; 395/140, 155, 161

[56] References Cited

U.S. PATENT DOCUMENTS

| Re. 31,044 | 9/1982 | McReynolds et al. | 364/188 |
| 3,903,403 | 9/1975 | Ferguson et al. | 364/578 |
| 4,574,359 | 3/1986 | Ishizaka et al. | 364/571 |
| 4,613,952 | 9/1986 | McClanahan | 364/578 |

FOREIGN PATENT DOCUMENTS

| 8418504 | 7/1984 | United Kingdom . |
| 2161964A | 7/1985 | United Kingdom . |

OTHER PUBLICATIONS

Fiamass, Ltd., Confidentiality Agreement, Feb. 25, 1986.
Inpadoc/World Patents Index search report, Dec. 22, 1988.

Primary Examiner—Joseph Ruggiero
Attorney, Agent, or Firm—Kirkland & Ellis

[57] ABSTRACT

A computerized dynamic displacement control display system which involves a method of systematically simulating and displaying the cyclical components of the behavior of the movement of a curve represented by a plurality of points relating two parameters to one another, in which the following are obtained: a moving average of the curve; an oscillator, a series of dynamic moving averages; and pairs of inner and outer envelopes. This derived information is used as a basis to calculate the probable future movement of the curve. An industrial application of this method controls the flow of coolant liquid through a chamber. A temperature sensor supplies information to a computer which is in communication with the use through a keyboard and control unit. Sets of lines relating to the above derived information are displayed on a V.D.U., from which the user can either manually effect control of the rate of flow of the coolant liquid via a pump or request the computer to automatically effect the control to prevent the temperature of the coolant liquid exceeding or falling below given limits. The computerized control system may also be used to monitor certain parameters either in the production of chemicals in a large manufacturing plant or in the generation of electricity in nuclear reactors.

7 Claims, 7 Drawing Sheets

COMPUTERIZED DYNAMIC DISPLACEMENT
DISPLAY CONTROL SYSTEMS

CROSS-REFERENCE TO RELATED APPLICATION

This is a continuation of co-pending application Ser. No. 07/456,610 filed on Dec. 21, 1989 which is a abandoned continuation of 07/139,017 filed on Dec. 29, 1987 (now abandoned) which is a continuation-in-part of U.S. Ser. No. 06/755,573 filed Jul. 16, 1985 (now abandoned).

FIELD OF THE INVENTION

The present invention relates to a computerized dynamic displacement control system which involves a method of systematically simulating and displaying the cyclical components of the behaviour of the movement of a curve represented by a plurality of points relating two parameters to one another by utilizing the computerized system to perform calculations in order to predict the future movement of the curve.

One use of such a computerized control system is to enable financiers and other monetary experts to predict future movements of stocks, shares, bonds, commodity and currency to enable them to advise their clients regarding the best moments in time to buy or sell any particular market or market group.

Another application of the computerized control system of the present invention is the control of a variety of different types of manufacturing processes where it can be critical to maintain a particular parameter (e.g. temperature) within specified limits. Thus the system of the present invention is able to predict the future movement of the particular parameter involved in the manufacturing process so as to be able to take immediate action to prevent said parameter exceeding or falling below predetermined critical values.

Yet another application, and in many ways a more important one, is monitoring various parameters either in the production of chemicals in large manufacturing plants or in the generation of electricity in nuclear reactors, with a view to ensure early detection of any irregularities occuring whereby the plant or reactor can be safely shut down before an accident occurs.

Large chemical plants are frequently cited near residential areas, so they present a hazard to the local community should any of the processes of manufacture go wrong, or get out of control. In particular, the disaster at the Union Carbide plant in Bophal, India, was one where something, not readily detectable in its early stages, went very wrong, and as a result a vast cloud of toxic gas killed and maimed large numbers of local Indians.

Minor disasters at chemical plants, either explosions or the release of toxic materials are all too frequent. However they are just the tip of the iceberg.

A far more serious and hazardous threat is posed by nuclear reactors and nuclear processing plants. The dangers posed by excessive exposure to nuclear radiation are well known.

Generation of electricity utilizing steam produced from heat generated in a nuclear reactor is ever increasing throughout the world. Some countries, e.g. France, produce nearly 40% of their electricity by nuclear reaction. Whilst as a general rule nuclear generating and processing plants are housed well away from high density population areas, e.g. at Dounreay, Scotland, nevertheless, a radioactive leak can have far more devastating consequences. Numerous small leaks have occurred in plants and reactors over the past 30 years, e.g. at Sellafield in Cumbria. The majority of these produce relatively little radioactive contamination, which seldom if at all affect the local inhabitants.

On the other hand there have been two major radioactive leaks involving nuclear reactors generating electricity.

The first of these disasters occurred at Three Mile Island, Pa., on Mar. 28, 1979. This disaster happened as a result of loss of feed water to the steam generators, and a failure to observe that something was going wrong. As a result the reactor core was badly damaged when core temperatures got out of control and reached $UO_2$ fuel liquefaction and fuel melt. The upper half of the core disintegrated on quenching, whilst the lower half of the core collapsed into the reactor vessel lower head. As a result there was an intensive release of radioactive material into the atmosphere which drifted downwind, causing considerable contamination of the surrounding environment.

The second of the disasters occurred at Chernobyl in the Soviet Union on Apr. 25, 1986. This was a far more serious accident involving vast areas of land in the Soviet Union becoming very heavily contaminated by radioactive fall out. In some respects, fortunately, the Chernobyl disaster was of such a magnitude that even the Russians could not keep it hushed up. The radioactive cloud resulting from the Chernobyl disaster was first detected by the Swedes, who in fact shut down their own nuclear power stations fearing a disaster in one of their own reactors. The No. 4 reactor at the Chernobyl complex effectively exploded, killing a number of people at the site and causing severe radioactive burns to a large number of other personnel at the site. The overall effect on the human race and particularly the inhabitants of Kiev and district will not be known for many years to come. Many thousands of Russians in the Kiev area may well die prematurely as a result of exposure to radiation.

Although it is not fully known exactly what went wrong at Chernobyl, negligence and incompetence clearly played a large part in what was to date the worst nuclear disaster involving an electric power generating station.

DESCRIPTION OF THE PRIOR ART

Whilst safety procedures have been greatly tightened up as a result of the Chernobyl disaster, known methods of detecting faulty or malfunctioning equipment in chemical or nuclear plants may not in certain circumstances be able to react quick enough to prevent an explosion or leak of radioactive material from occuring. It is not feasible to summarize the multitude of known monitoring devices at present used in industrial processes, chemical plants and nuclear reactors. It is sufficient to point out that all such known monitoring devices will only react when there is imminent danger from an explosion or leak of hazardous materials. They cannot forsee what will happen at some future point in time, so that in many circumstances the warning which known monitoring systems can provide is totally inadequate. Thus, whilst a risk of impending disaster may be reduced, at present there is no guarantee that such a disaster as the explosion at Chernobyl will not occur again.

SUMMARY OF THE INVENTION

Generally speaking, the computerized control system of the present invention is based on a method of functional analysis which incorporates traditional moving averages and traditional oscillators to calculate dynamic moving averages, and a basis of calculating for these dynamic moving averages using descending Fibonacci ratios of the basic moving average. It is thus able to predict future movements of a curve relating two parameters to one another before such movements in fact become apparent.

According to the present invention there is provided a computerized dynamic displacement display control system involving a method of systematically simulating and displaying the cyclical components of the behaviour of the movement of a curve represented by a plurality of points relating two parameters to one another by utilizing the computerized control system to perform calculations in order to predict the future movement of the curve, said method including the steps of:

(a) obtaining a moving average of said curve over a specified range of one of said parameters;

(b) calculating the difference between the actual value of the curve and the moving average to produce an oscillator;

(c) calculating the average of the oscillator over the same range of said one parameter;

(d) adding this oscillator average to the moving average to produce a first dynamic moving average;

(e) repeating the calculation of the average of the oscillator over a plurality of shorter ranges, each range being shorter than the last by a given ratio to produce a series of dynamic moving averages;

(f) determining the maximum deviation of the curve from the moving average and also all the associated dynamic averages previously calculated;

(g) using this maximum value of deviation to generate an envelope whose upper band for each point in the range is the sum of this value and the lowest value represented by the moving average or any of its associated dynamic moving averages, at that point, and whose lower band for each point in the range is calculated by subtracting this deviation value from the highest value represented either by the moving average or any one of its associated dynmamic averages at that point;

(h) generating a plurality of inner and/or outer envelopes by repeating the above process of envelope generation of step (g) using values of said maximum deviation related thereto by said given ratio and multiples of said given ratio;

(i) repeating all the above process steps in sequence using a plurality of ranges of moving average each said range being related to said first range by said given ratio or a multiple of said given ratio;

(j) displaying each set of lines which includes the moving average its associated dynamic moving averages and evelopes;

(k) systematically repeating the display of method step (j) according to the said given ratio and multiples of said given ratio; and (l) utilizing the computerized control system to interpret the displayed information obtained by the above method steps to enable a prediction to be made concerning the future movement of said curve, from which interpreted information appropriate action or control of items relating to said parameters can be made.

Preferably said given ratio is the well known Fibonacci ratio (1.618), and the multiples thereof are power multiples.

Preferably the computerized control system is used with a video display unit whereby a visual display of the various sets of lines systematically repeated for the Fibonacci ratio and power multiples thereof in order to predict the future movement of the curve.

The computerized control system involving a method of systematically simulating and displaying the cyclical components of the behaviour of the movement of a curve relating two parameters to one another has a wide industrial application. Two examples are:

(a) providing the necessary control in a process of manufacture to prevent some parameter exceeding or falling below a predetermined value; and (b) monitoring an industrial plant or a nuclear power generating station in order to predict future values of a parameter within the plant whereby an advance warning can be given of events which might lead to a hazardous or dangerous situation.

BRIEF DESCRIPTION OF THE DRAWINGS

The present invention will now be described in greater detail by way of example with reference to the accompanying drawings, wherein.

Before discussing the preferred embodiments of the invention in detail, it should be pointed out that the method of functional analysis was first developed to enable financiers and other monetary experts to predict future movements of stocks, shares, bonds, commodity and currency for the purpose of advising their clients when to buy or sell any particular market or market group. As will be evident, it was only subsequent to the development of the method of functional analysis in the financial world, that I realized its potential in the industrial world. Thus in the detailed discussion of the preferred embodiments, the financial aspect is dealt with first followed by two examples of industrial application, the first to the monitoring of the temperature of a coolant liquid which is used during an industrial process, and the second to the monitoring of a nuclear power generating station. It will be appreciated that these two examples are by no means exhaustive and it will be evident to those skilled in the art the numerous other industrial applications which the method of functional analysis could be applied to.

DESCRIPTION OF THE PREFERRED EMBODIMENTS

(a) THE MONETARY APPLICATION

Figure 7:
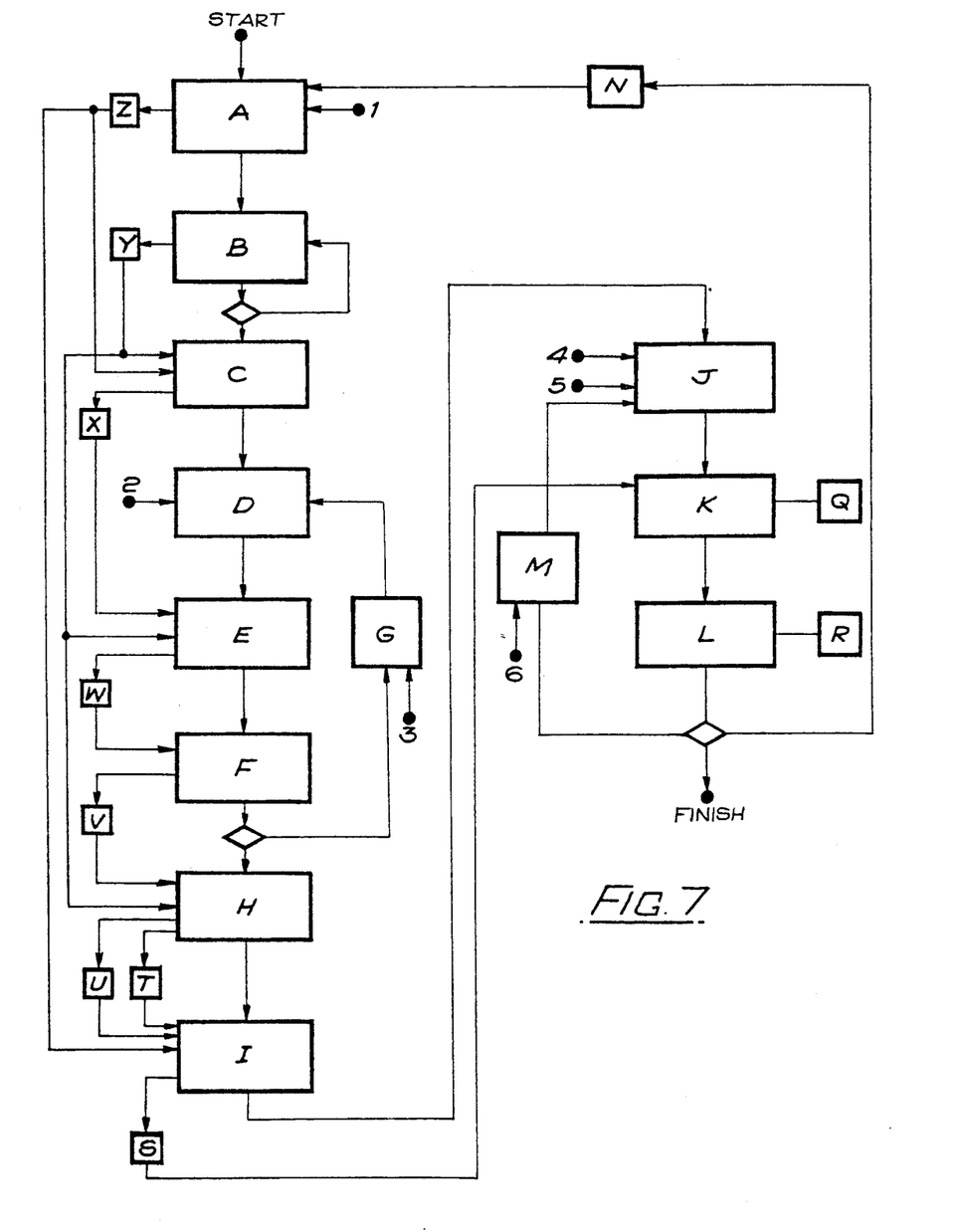
FIG. 7 is a flow chart to explain how the various curves shown in FIGS. 1 and 2 are obtained step by step in the system of functional analysis.

In order to explain the complete system of functional analysis, the monetary application will be explained in substantial detail with reference to the graphs of FIGS. 1 and 2 and the flow chart shown in FIG. 7. It will be appreciated by those people who are skilled in the art at computer operation and manipulation, that it is a readily easy matter to program the computer with which the system is associated to operate in a particular way from a set of values fed into it, in order to obtain the various curves and functions from the basic curve which it is desired to monitor, to enable a reasonably accurate prediction of its future movement to be made. The importance of this will be fully appreciated when the industrial applications are considered in detail, particularly the application to a nuclear processing plant or power generating station.

Figure 1:
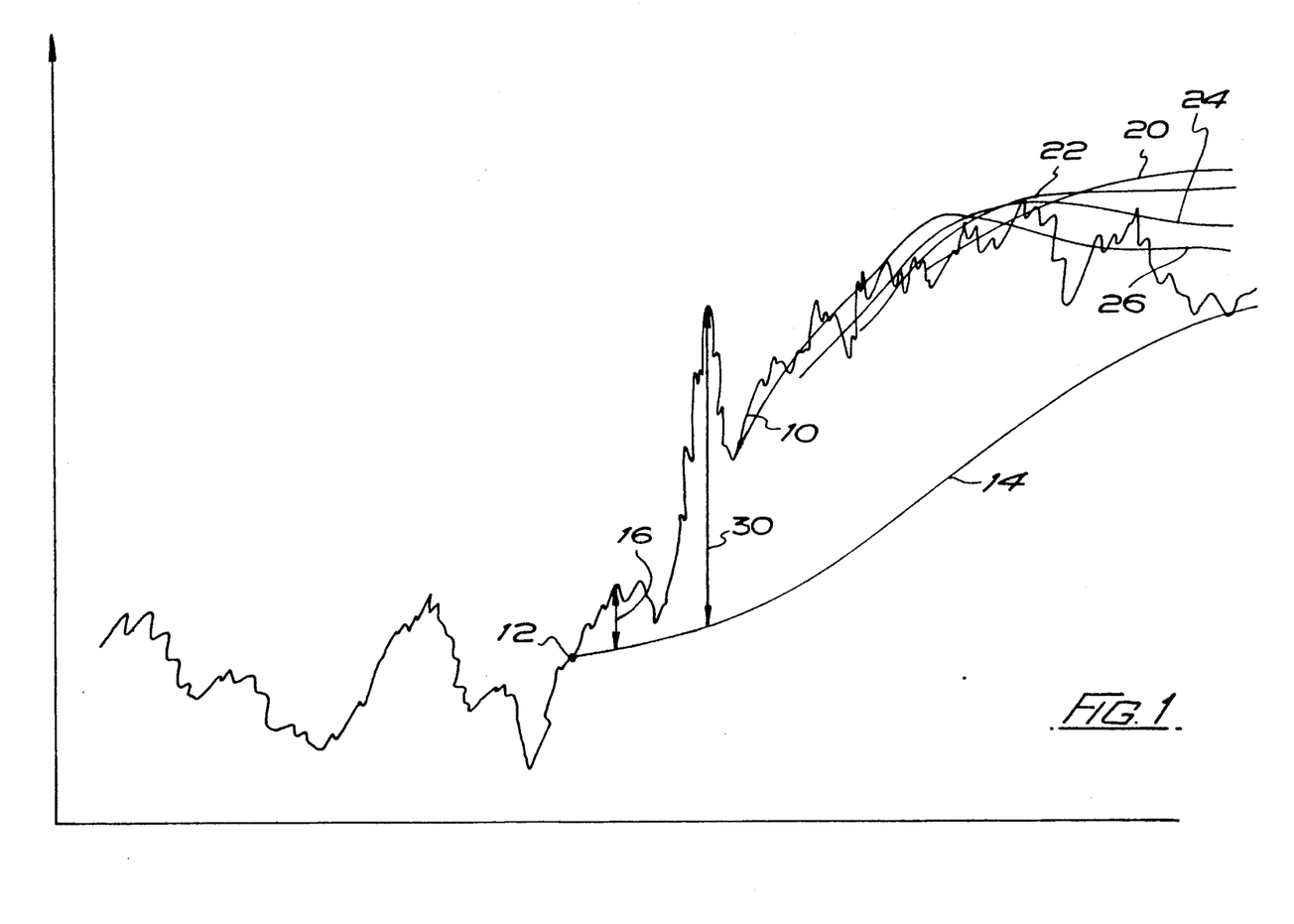
FIG. 1 is a graph illustrating how in the system the oscillator and a series of dynamic moving averages are obtained.
Figure 2:
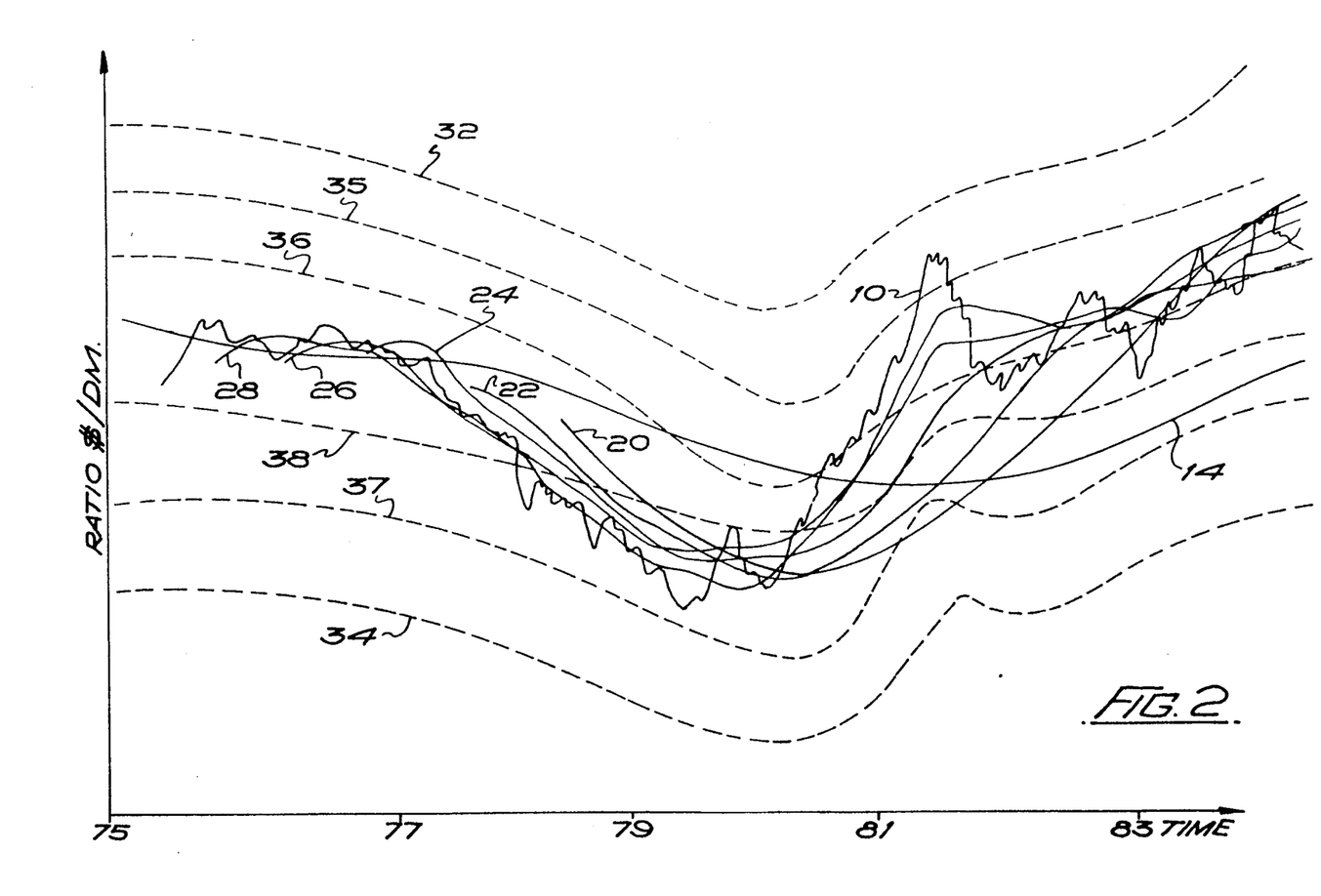
FIG. 2 is a graph showing the value of the U.S. dollar against the Deutsche Mark over the period 1975-1983 together with five dynamic moving averages and three envelopes derived according to the method of the present invention.

FIGS. 1 and 2 show how the various curves and functions which enable the system of functional analysis to be operated, are calculated and obtained by the computer. FIG. 7 shows the complete flow chart step-by-step of the operation in obtaining such parameters as the moving average, the oscillator, the dynamic moving averages, and the envelopes which have their upper and lower bands. The computer performs all the above operations from the information which has previously been stored therein as well as the particular data concerning the actual curve to be monitored, which is fed in at the time it is desired to make an evaluation of the curve and predict its possible future movement.

Referring first to FIG. 1, the curve whose magnitude is plotted as ordinate to a base of time is shown at 10. Point 12 represents the average of the last 233 points along the abscissa axis. From this information it is possible to derive a moving average of the curve 10 represented by the smooth curve 14. Each point on the moving average curve is calculated using only the last 233 points of the curve 10 immediately proceeding the point in question on the curve 14. Thus, the first point of the moving average 14 is calculated using the 233 points on curve 10 previous to the point 12. The next point is obtained by adding one point to the right of point 12 and substracting one from the start of curve 10, and so forth along curve 10 until the end is reached. It will be noted that the value of the curve 14 lags behind that of the curve 10 over the substantial rise in magnitude thereof after the point of first calculation 12. At any given points having the same time (same values of abscissa), the difference in value between the curve 10 and the moving average 14 is the oscillator 16, so termed because its value oscillates along the abscissa axis from the point 12. By using the average of the oscillator (not shown) over sets of adjacent periods each of which includes the same number of points, the first dynamic moving average 26 is obtained by adding this moving average of the oscillator to the moving average. Likewise by using the average of the oscillator over a plurality of shorter periods using a number of points which are related to the previous number 233 divided by a given ratio which in this example is the well known Fibonacci factor (1.618) and power multiples of this factor (i.e. 144,89,55 etc.), a further series of dynamic moving averages 24, 22 and 20 are obtained as above.

A first envelope having upper and lower bands is generated using a maximum deviation 30 of the parameter from either the moving average or any of the dynamic moving averages, over the total range of the parameter being analyzed. Such a maximum deviation is readily obtainable by looking at all the oscillator values and selecting the maximum one as shown at 30 on FIG. 1.

Referring now to FIG. 2 which is a specific example of how the value of the U.S. dollar fluctuated against the German Dutsche Mark over the period 1975 to 1983, the curves shown whose calculation has been outlined above include the moving average 14 and a series of five dynamic moving averages 28, 26, 24, 22 and 20, as well as the actual value 10.

The upper and lower bands of the first envelope are shown by the curves 32 and 34 respectively. The upper band 32 is the sum of the maximum value of deviation and the lowest value represented by the moving average 14 or any of the dynamic moving averages 28 to 20 along each point of the abscissa. The lower band 34 is determined by subtracting the maximum value of deviation from the highest value represented either by the moving average 14 or any one of the associated dynamic moving averages 28 to 10 along each point of the abscissa.

Two further inner envelopes having respective upper bands 35 and 36 and respective lower bands 37 and 38 are generated by repeating the above process of envelope generation using values of said maximum deviation related thereto and multiplying it repeatably by the Fibonacci ratio; (i.e. by 1.618 or 0.618).

Although the above example shows only the generation of two further inner envelopes, it will be appreciated that more may be generated if required as well as a plurality of outer envelopes.

Next, all the above process steps are sequentially repeated using a plurality of ranges of moving average, each said range (number of points or length of time) being related to said first range by the Fibonacci ratio and sequentially by power multiples of said Fibonacci ratio.

Having generated the series of envelopes over the plurality of ranges of the moving average, the user can now display on the video display unit of the computer system, the original parameter, the moving average, the dynamic moving averages, the series of upper and lower envelopes for the first range of the moving average, by depressing the appropriate key on the manual keyboard associated with the computer. After the user has studied this display, he can now repeat the above process by depressing systematically in turn the keys which cause the ranges of moving average to be displayed on the video display unit, said ranges being related to the first displayed range by the Fibonacci factor and power multiples of the Fibonacci factor.

By carefully studying all the displayed information, the experienced user can then predict the future movement of the parameter. Experience has shown that this can be done with a very considerable degree of probability over the time frame to which the displayed moving average, dynamic moving averages and envelopes apply.

Alternatively, instead of the user making an assessment using all the information obtained and displayed by the above steps, the computer may then be required to make a predicted calculation of the future movement of the parameter. The user can thus depress the appropriate key on the keyboard, which will enable the computer to carry out the necessary prediction of the future movement of the parameter over any desired future range in time and to display this movement of the parameter together with the other associated curves, e.g. the moving average, the dynamic moving averages and the envelopes on the video display unit. As will be explained later, the computer can be programmed to assess the situation and make an appropriate decision which can be output in visual form on the screen of the video display unit as whether the future movement of the parameter is "up", "down" or "steady" and in the case of the first two an approximate evaluation of the change of magnitude over a required period of time.

Referring now to the flow chart shown in FIG. 7, a step-by-step explanation will be made as to how the computer operates on and performs the various calculations in order to obtain the moving average, the oscillator, the sets of dynamic moving averages, and the sets of envelopes having upper and lower bands. It will be appreciated that the following description merely supplements what has been previously stated as to how the various curves shown in FIGS. 1 and 2 are derived.

From "start", the first step shown by block A is to feed into the computer system via an input 1, the sets of values representing the curve 10. In the above example, approximately 610 points representing the movement of the curve 10 with respect to time are stored within block Z for future use in the computer system. The moving average represented by the curve 14 is obtained in block B by adding together the values of the first "m" of the points which have been stored within the computer system during the process of block A, and dividing by "m". This produces the point 12 which is the starting point of the moving average curve. In this example m=233. In order to obtain the moving average curve 14, the above process is repeated by adding one value of the curve 10 to the right of point 12 and subtracting the very first value at the left hand end of the curve 10. It is repeated step by step for each additional point value of the curve 10 right up to the present time. At each repetition of the step, the value of the moving average curve obtained is stored in block Y for future use in the computer system.

When the complete moving average curve 14 has been obtained and stored in block Y, the process moves onto block C. In block C the oscillator 16 is obtained. At each point from point 12 onwards the moving average curve 14 is subtracted from the corresponding points, on the original curve. This provides what is known as a difference array. A complete set of values thus representing the oscillator 16 at each point forwards of the point 12 is stored in a block X as the difference array.

When the difference array has been obtained in the above manner, the process passes onto the next step in block D. Set into block D via an input 2 is the required number of dynamic moving averages to be utilized in the system of functional analysis. In the above example, the number of dynamic averages is 5, being represented in FIGS. 1 and 2 by the curves 28, 26, 24, 22 and 20 which are respectively the first to fifth dynamic moving averages. In block E the computer calculates what is termed the oscar array. For the first dynamic moving curves, with m set 233, it adds together the differences obtained above in sets, each set having 233 points, and divides by 233. This is repeated for the next set of points and the next, until the end of the curve is reached. This method produces the oscar array which is stored in block W for use in the next step. The process then passes onto block F where the dyna array is generated. Starting from the beginning the computer adds the first oscar to the first value of the moving average previously stored in block Y. Then the second oscar is added to the second value of the moving average and so forth until the last oscar is reached. In this way the first moving average represented by curve 28 is obtained and stored in block V. It will be appreciated from what has been said above that the oscar array is in fact a set of values representing areas between the moving average 14 and the curve, the values being sampled in sets each set having 233 points so that the distance between sets is equispaced along the abscissa axis.

Once the first dynamic moving average has been stored in block V, the whole process is repeated for the second dynamic moving average represented by the curve 26. Input into block G via an input 3 is the given ratio and desired multiples thereof. In the example the given ratio is the Fibonacci factor 1.618. In block G, the computer then effects a division of the number m=233 by the Gibonacci factor to obtain the number 144. The whole process of obtaining the oscar array and the dyna array for the second dynamic moving average is repeated for the smaller number of points. Likewise once the second dynamic moving average represeted by the curve 26 has been obtained, it is stored in block V. Again the process is repeated third, fourth and fifth times, the computer each time effecting a further division of the number of points by the Fibonacci factor, in order to obtain the oscar array and the dyna array for the dynamic moving averages for the curves 24, 22 and 20 which are again all stored in block V.

Once the final dynamic moving average has been obtained, the process moves on to block H. Before the computer can proceed to the process of calculating the upper and lower bands of the sets of envelope it must form what is known in the art as a delta array. The delta array is determined in blocks H and I utilizing the functions of high array and low array.

In block H, for each point n, the computer derives high array by searching for the highes dynamic moving average or moving average at that point. Likewise the computer derives low array by searching for the lowest dynamic moving average or moving average at the same point. The process is repeated for each point to the end of the curves, and the high array and low array are stored in respective blocks U and T.

Next the process moves on to block I where delta array is calculated. At each point n delta array is determined by finding the difference between high array and the curve 10 or the difference between low array and the curve 10 at each point n. The computer then searches for the highest value in the complete delta array and stores the value in block S as delta high.

The envelope arrays are calculated in blocks J, K and L. Input into block J via inputs 4 and 5 are the selected number of envelopes which it is desired to display and the given ratio respectively. In this example, the given ratio is the Fibonacci factor 1.618.

The envelope arrays for the upper and lower bands are calculated in blocks K and L respectively. The upper band of the first envelope is calculated in block K by adding delta high to the lowest of the dynamic moving averages and the moving average. Likewise in block L, the lower band of the first envelope is calculated by subtracting delta high from the highest of the dynamic moving averages and the moving average. This process in both blocks is repeated for each point n along the curves to obtain a complete set of envelope arrays for the upper and lower bands of the first envelope. When this has been completed the envelope arrays are stored in blocks Q and R respectively for the upper and lower bands.

The whole process is then repeated for the second envelope by dividing the values by the Fibonacci factor. Likewise the third envelope is calculated by dividing the previous value used in calculating the second envelope by the Fibonacci factor.

This repetition of the process of envelope calculation is performed by the block M which returns the process back to block J, until the upper and lower bands of all the sets of envelopes have been generated. Once this has been completed the process reverts right back to block A via block N where the ranges of the curves are all divided by the given ratio, which as mentioned above in this case is the Fibonacci factor, this complete return to the beginning of the process being performed a number of times, each time the previous values being divided once again by the Fibonacci ratio. Finally, on completion the process is terminated and all the results obtained which have been stored in the various blocks can be systemmatically called up and displayed on the screen of the V.D.U.

Thus it will be appreciated from the above description that in the case of the financial application of the invention, it is thus possible for the user to predict, whether using his own experience or with the aid of the computer, with very considerable accuracy the movements of any or a selected group of stocks, shares, bonds, commodity and currency. In this way the user of the system is able to advise his Clients when they should sell or buy their respective holdings.

The financial application will now be discussed in greater detail by way of an example shown in FIGS. 3A and 3B.

Figure 3A:
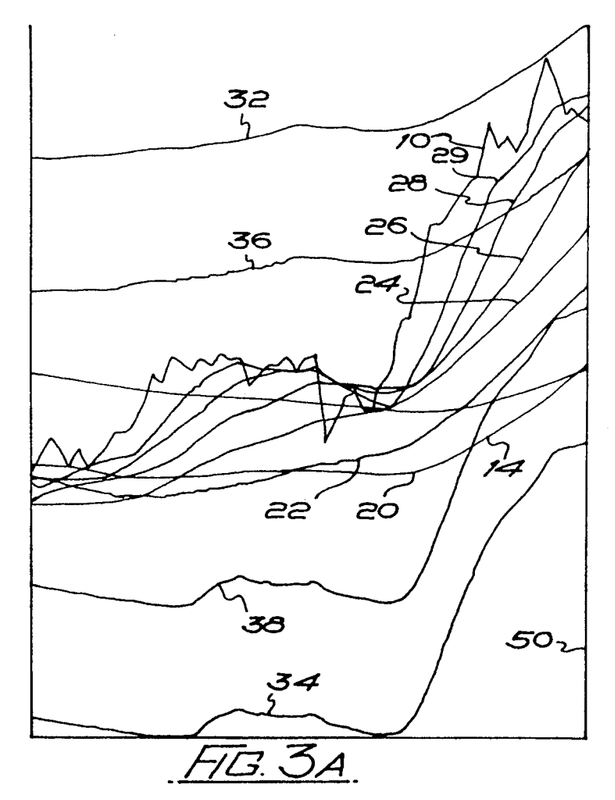
FIGS. 3A and 3B are graphs of curves showing how the market in fact moved after a prediction was made from the curves shown in FIG. 3A.

Referring first to FIG. 3A, the graph shows the price of the holding plotted to a base time, this being shown by the curve 10 (the parameter of FIG. 1), the moving average 14, six dynamic moving averages 20, 22, 24, 26, 28 and 29, and pairs of upper and lower envelopes 32, 34 and 36, 38. If you observe the way the moving average 14 has behaved, you will note that the long term trend is turning from down to up. The price shown by curve 10 has rallied to the upper outer envelope 32 and the moving dynamic averages are all well splayed out at the current point in time indicated by the line 50.

You should further note that the price shown by the curve 10 having bounced off the upper outer envelope 32 has cut through the two shorter term dynamic moving averages 29 and 28. At this point you can sell the holding, and make quite a reasonable short term gain if you had bought it at the start of the graph when the price as shown by the curve 10 was well below the moving average 14.

Figure 3B:
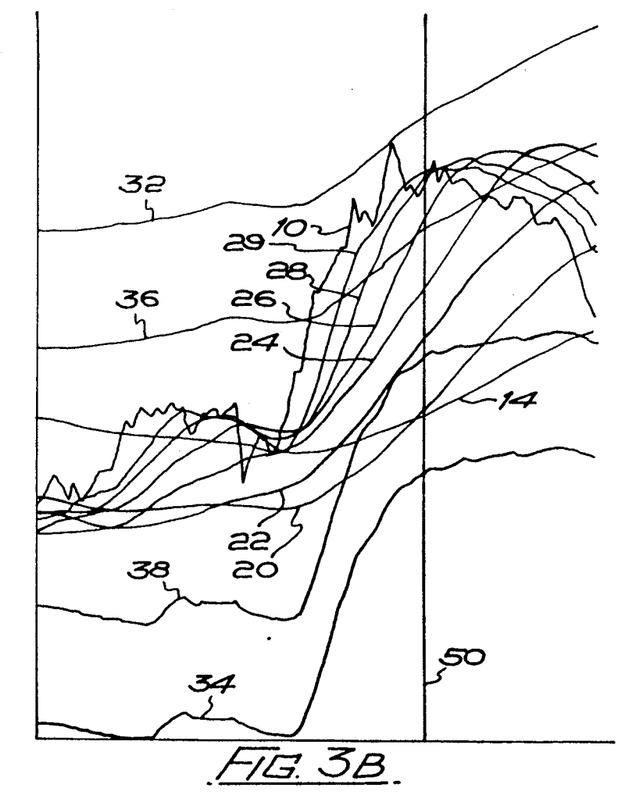

FIG. 3B shows how the various curves in fact moved beyond the line 50, and it will be noted that although the price tried to break through the dynamic moving average 29 two times, it subsequently fell sharply and was rapidly approaching the moving average 14. In other words it was an excellent time to sell.

With sufficient practice, it becomes an easy matter to quickly spot, with the aid of the various ranges of moving averages using the Fibonacci ratio and power multiples thereof, when the price of the holding is likely to rise or fall and thus make an assessment as whether to buy or sell. All the necessary information relating to the curves can be stored within the memories of the computer, so that the computer can itself make an appropriate assessment of the situation and give a visual indication via the visual display unit of the predicted change in the price of the holding, i.e. whether "up" or "down" and also by what magnitude. Hence the user with the aid of the computer print out can make a quick decision as to whether to buy or sell that particular holding.

In addition to the above display on the video display unit, it is possible to combine the display with another display on the same screen in order to obtain a simultaneous display of dynamics. This consists of a display underneath or above the main display of the high array previously referred to in connection with the flow chart together with the dynamic moving averages and the upper and lower bands superimposed thereon.

In the case of the industrial application the value of a particular parameter, e.g. the temperature of a coolant liquid, can be continually monitored throughout the production or a continuous production process. By using the above process, the user would be able to predict in advance when the temperature was going to exceed a given critical and take appropriate action to prevent such an occurrence which could give rise to dangerous or explosive conditions causing damage and/or injury to personnel.

There are thus considerable opportunities of using the system of functional analysis in all parts of the industrial world as well as in many other fields, e.g. the medical field where a patient's blood pressure can be continuously monitored.

(b) APPLICATION TO A METHOD OF MANUFACTURE

A general industrial application of the system of functional analysis as applied to a method of manufacture will now be described in greater detail with reference to FIG. 4.

Figure 4:
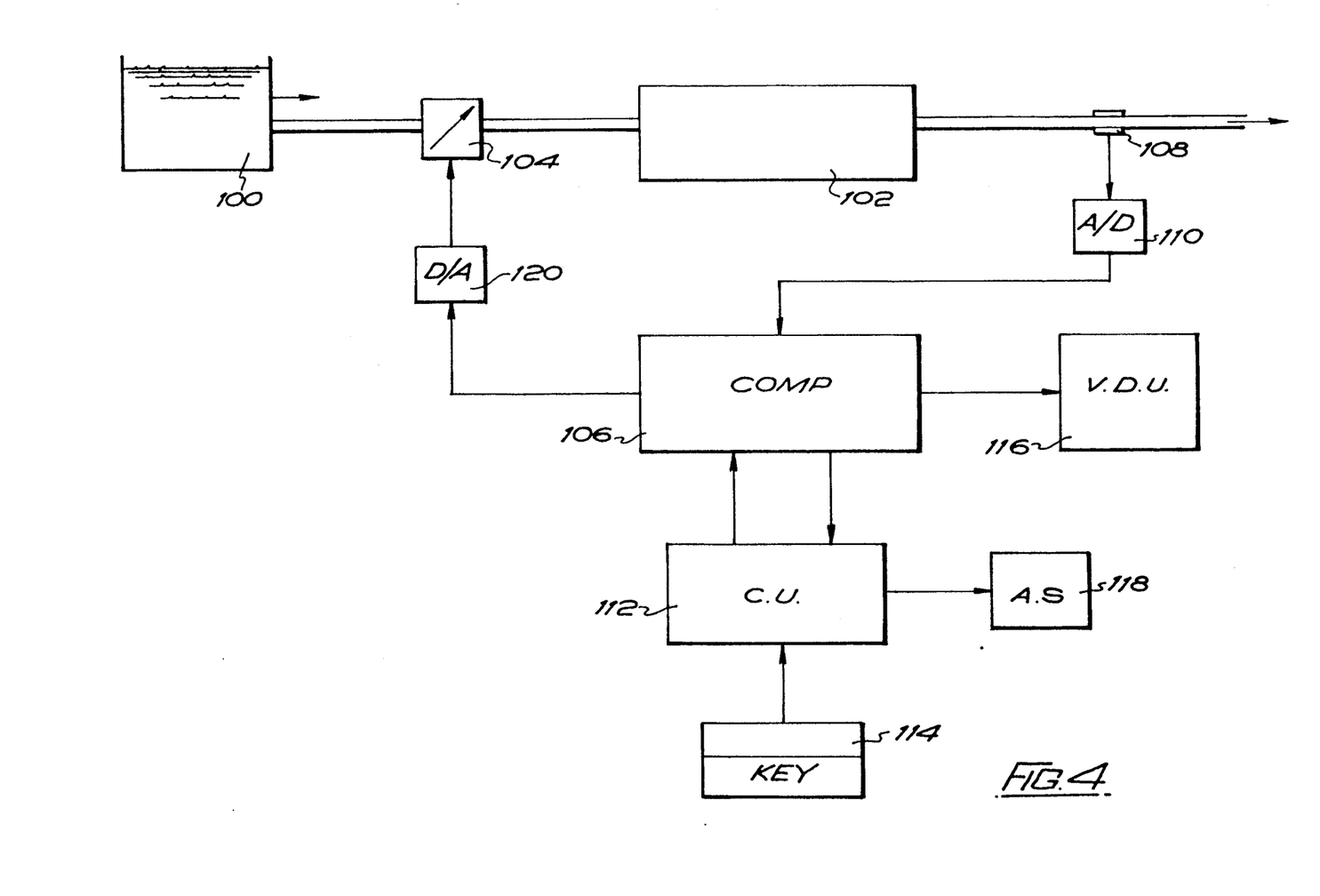
FIG. 4 is a block diagram of a computer controlled cooling system showing one way in which the method of functional analysis is applicable to an industrial process of manufacture.

Referring now to FIG. 4, the basic layout of a system, which is capable of systematically simulating and displaying the cyclical component of the behaviour of the temperature of a coolant liquid in an industrial process, is shown in block form.

In this example of industrial application, the temperature of a coolant liquid is to be monitored, to ensure that it does not either exceed a given temperature or fall below a given temperature, so that the products of the manufacturing process emerge without defect. Cooling liquid from a reservoir 100 is pumped to a chamber 102 in which the manufactured products are housed by means of a pump 104 whose speed of pumping can be varied. A computer 106 receives the value of the temperature of the coolant liquid output from the chamber 102 from the sensor 108, via an analog-to-digital converter 110 which converts the value of the temperature into digital form. A control unit 112 is in two way communication with computer 106. A manual unit 114 including a keyboard provides the control unit with information to control the computer 106.

The system also includes a video display unit (V.D.U.) 116 on which the temperature of the coolant liquid, the moving average, the dynamic moving averages, and the various pairs of envelopes relating to the temperature of the coolant liquid can be displayed. An alarm system 118 can be provided to give a visual and/or audible indication that the predicted position of the temperature of the coolant liquid will in the near future, either exceed the upper temperature limit or fall below the lower temperature limit.

The rate of flow of the coolant liquid is controlled by means of the pump 104, the speed of whose motor is controlled by the computer 106 through a digital-to-analog converter 120.

The operator in charge of the system has the manual unit 114 and keyboard together with the V.D.U. 116 in front of him. He can thus continually monitor and display on the V.D.U. 116, the cyclical components of the behaviour of the movement of the temperature of the coolant liquid. If he is on manual operation he can input instructions into the control unit 112 to enable the computer 106 to control the pump 104 via the digital-to-analog converter 120, so as to increase or decrease the rate of flow of the coolant liquid in the event that a prediction of the future movement of the temperature brings it close to one of the limit temperatures.

If the operator decides to hand over to the computer he operates the manual/automatic control button on the keyboard of the manual unit 114. The computer 106 now takes over and controls the rate of flow of the coolant liquid by means of the pump 104 according to the prediction it makes using appropriate information stored in its memory regarding the interpretation of the moving average, the dynamic moving averages and the pairs of envelopes from the various ranges derived from the Fibonacci factor and power multiples thereof.

(c) APPLICATION TO MONITORING A NUCLEAR POWER GENERATING STATION

An application of the above described method of functional analysis will now be described in connectin with monitoring a nuclear power electricity generating station. The hazards of generating electricity by nuclear power are clearly evident as has been referred to above in connection with the disasters at Three Mile Island, Pa., and Chernobyl in the Soviet Union.

Figure 5:
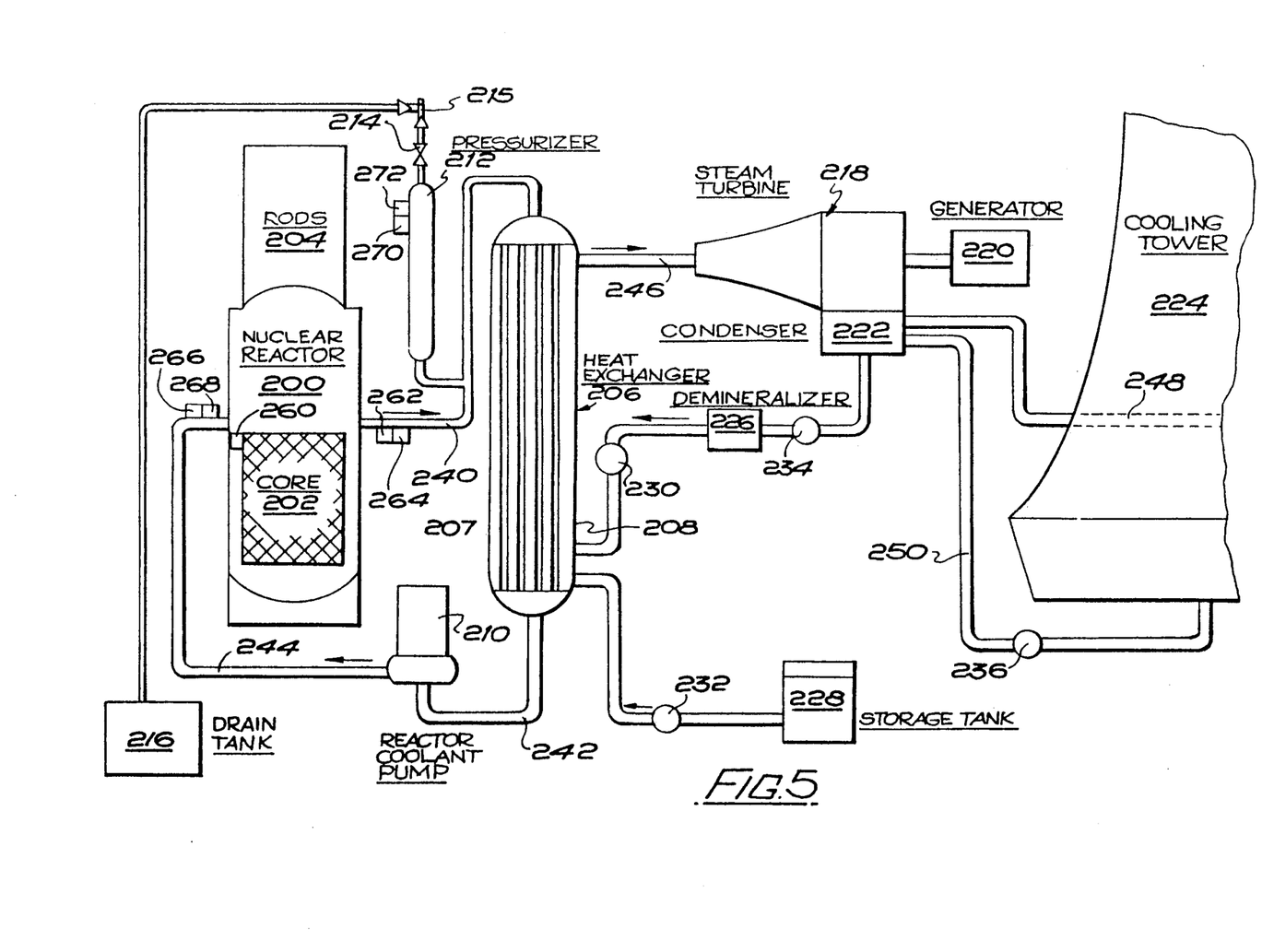
FIG. 5 is a schematic block diagram of a nuclear power generating station in which the majority of the important parts have certain parameters monitored, whereby the method of functional analysis is applied to check the correct operation of the nuclear power generating plant.

Referring now to FIG. 5, a description will first be given of a nuclear power generating statin in which the nuclear reactor is of the pressurized water type. Only the main elements are given in block form. The nuclear power generating station includes the following main elements:

(a) a nuclear reactor 200 having a reactor core 202 and control rods 204;

(b) a heat exchanger 206 having primary and secondary circuits 207 and 208 respectively;

(c) a reactor coolant pump 210;

(d) a pressurizer 212 and associated remote operated block valve 214 and relief valve 215;

(e) a drain tank 216;

(f) a steam turbine 218;

(g) an electricity generator or alternator 220;

(h) a steam condenser 222;

(i) a cooling tower 224;

(j) a demineralizer 226; and (k) a storage tank 228.

In addition to the reactor coolant pump 210, the nuclear power generating station includes four pumps as follows:

(l) a main feedwater pump 230;

(m) an auxiliary feedwater pump 232;

(n) a condensate pump 234; and (o) a circulating water pump 236.

The primary circuit 207 of the heat exchanger 206 operates at high pressure to prevent reaching a bulk saturated water temperature and net steam formation during normal operation. The water exits the core 202 of the nuclear reactor vessel 200 via a large diameter outlet pipe 240 and enters the top of the heat exchanger 206. It is then carried by pipes within the heat exchanger 206 to the bottom thereof, where it is pumped back to the nuclear reactor by the reactor coolant pump 210 through pipes 242 and 244.

The lower end of the pressurizer 212 is connected to the outlet pipe 240 from the nuclear reactor 200. The pressurizer 212, which is normally half full, acts as both the primary circuit accumulator plus controller of the system pressure. It controls pressure by maintaining the proper pressure limits in its steam filled upper zone through a combination of electrical heaters in its lower water filled zone and spray cooling in its upper zone. The upper zone is connected to the drain tank 216 via the remote operated block valve 214 and pressure relief valve 215.

The secondary circuit 208 of the heat exchanger 206 supplies steam to the steam turbine 218 via a pipe 246 connected to the upper section of the heat exchanger 206. Water condensed in the condenser 222 is pumped back to the lower section of the heat exchanger 206 via the demineralizer 226 and pumps 234 and 230. Steam which has not condensed is passed to a perforated pipe 248 in the cooling lower 224. Condensate is collected at the base of the cooling tower and pumped back to the condenser 222 through a pipe 250 by means of the pump 236. As losses occur in the secondary circuit 208 due to some uncondensed steam escaping up the cooling tower 224, the level of the water in the heat exchanger 206 may be kept topped up by introducing additional water from the storage tank 228 by means of the pump 232 which is energized and de-energized as appropriate to maintain the water level within the heat exchanger 206 within predetermined limits.

As mentioned in the opening paragraphs of the Specification, the disaster at Three Mile Island occurred due to loss of feed water in the primary circuit to the heat exchanger. It was basically failure to notice or observe that anything was wrong which ultimately lead to the disintegration of the reactor core and the resulting discharge of radiation.

In order to prevent a subsequent repetition of the events which occurred at Three Mile Island on Mar. 28, 1979, and other possible malfunctions of the nuclear reactor, the method of functional analysis of the present invention can be applied to monitor various parameters in the reactor core 202 and the primary circuit 207 between the reactor core and the heat exchanger 206 and the pressurizer 212.

As shown in FIG. 5, various monitoring devices are located by way of example for the following purposes:

(a) device 260 for monitoring the temperature of the core 202;

(b) devices 262 and 264 at the outlet of the nuclear reactor 200 for monitoring the temperature and flow of the water respectively in the primary circuit as it leaves the reactor core;

(c) 266 and 268 at the inlet of the nuclear reactor 200 for monitoring the temperature and flow of the water respectively in the primary circuit just before it enters the reactor core; and (d) 270 and 272 in the upper zone of the pressurizer 212 for monitoring the temperature and pressure of the steam therein.

In addition to the above the secondary circuit may likewise be monitored as appropriate. Such monitoring is not illustrated, but it will be appreciated by those skilled in the art, which are the important parameters and locations in need of monitoring to detect malfunctioning of the secondary side of the circuit.

Figure 6:
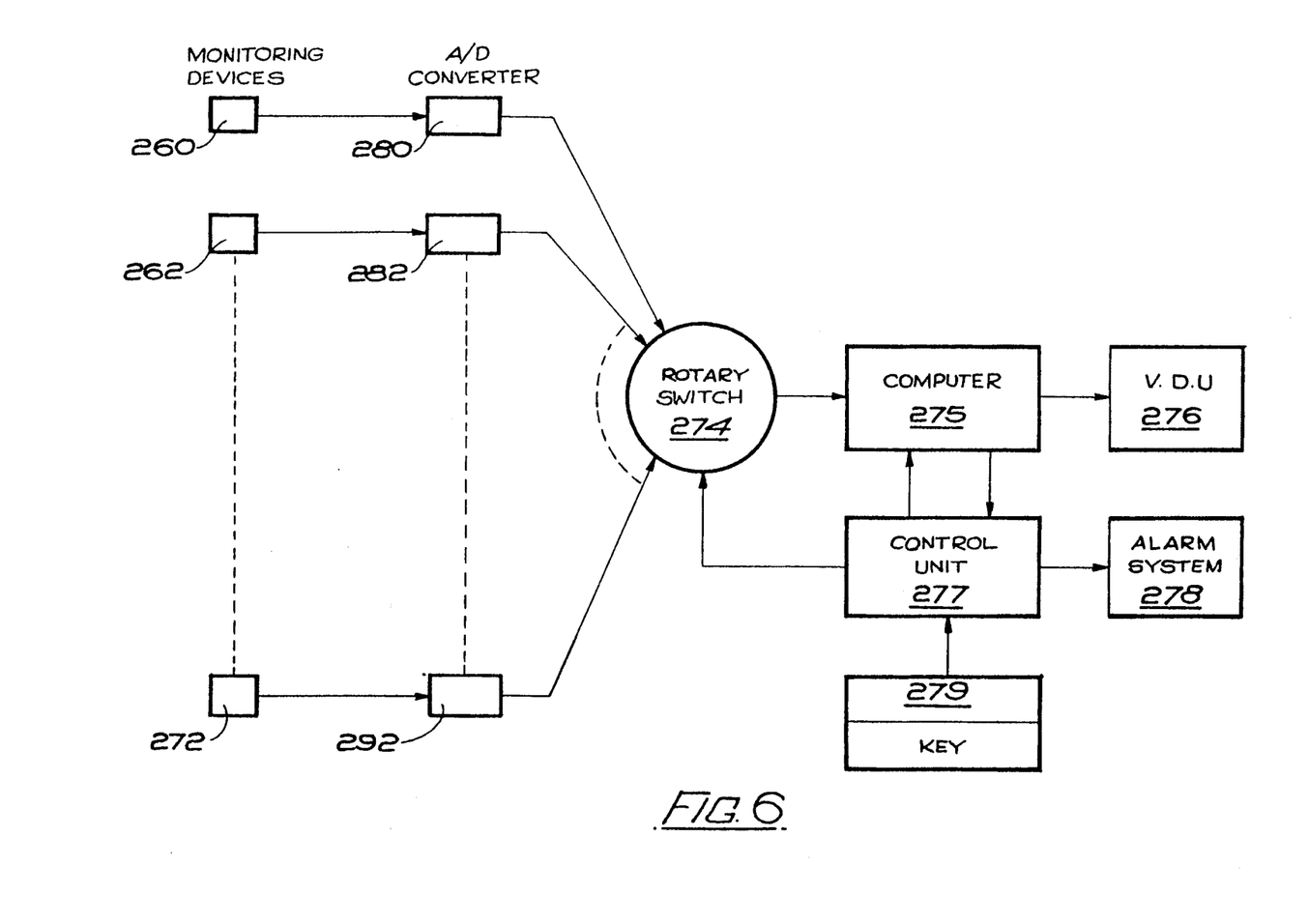
FIG. 6 is a block diagram showing how the monitored values of the parameters of the nuclear power generating station are utilized in the method of functional analysis for the purpose of giving warning of the development of a situation which could give rise to a dangerous or hazardous operation possibly leading to a radioactive leak.

Referring now to FIG. 6, the monitoring system for enabling the method of functional analysis to be carried out is shown in block form. In addition to the seven monitoring devices 260 to 272, the system includes a rotary switch 274, a computer 275, a video display unit 276, a control unit 277, an alarm system 278, a manual unit 279 including a keyboard, and analog-to-digital converters 280 to 292 connected to the respective parameter monitoring devices 260 to 272. The rotary switch 274 can be programmed through the keyboard in the manual unit 279 and the control unit 277 to look at any one parameter to sequentially switch from one to the next in any desired sequence or period of time. A selected parameter is then analyzed within the computer 275 in accordance with the computerized dynamic displacement display system outlined in detail in connection with the monetary application and the resulting curves or desired parts thereof being displayed on the video display unit 276.

Thus each and every parameter can be carefully monitored and displayed on the screen of the VDU 276 for assessment. In addition the computer is programmed to predict on the basis of the above method of functional analysis, when hazardous or dangerous situations are likely to occur. In that event an appropriate visual and/or audible signal is emitted by the alarm system 278. Accordingly, immediate steps can be taken to isolate and shut down the nuclear reactor as quickly as possible before damage results to the core.

In the event that the appropriate manual action is not taken within a specified time, the computer could readily be programmed to itself to effect a shut-down of the nuclear reactor in a safe manner as quickly as possible. It will be appreciated by those skilled in the art how such a shut-down should be carried out by the computer.

It will be appreciated that such a monitoring system as disclosed above for a nuclear power generating station, disasters such as Three Mile Island where there was a radiation leak, and Chernobyl where there was a nuclear explosion could have been prevented, since the computer would have been able to predict from the parameter curves by means of the method of functional analysis, that the plant was heading towards a hazardous or dangerous situation, and be able to give an adequate warning to enable a safe shut down of the nuclear reactor.

Numerous modifications are possible within the scope of the invention which is not limited to the specific examples described above.

What is claimed is:

1. A method of controlling a physical process based on analyzing a functional relationship between two parameters of the physical process comprising the steps of:
   (a) measuring the values of the two parameters, and entering an input set of said measured values of the two parameters into a computer;
   (b) computing a moving average of one of the two parameters over a predetermined range of the other of the two parameters;
   (c) computing a plurality of dynamic moving averages from the input set and the moving average, wherein the dynamic moving averages are mutually related by a predetermined ratio;
   (d) computing an envelope from the input set, the moving average and the plurality of dynamic moving averages;
   (e) successively repeating the foregoing steps (b) through (d) for successive ranges of the other parameter, wherein the successive ranges are related to the predetermined range by the predetermined ratio;
   (f) determining relative behaviors of the input set, the moving averages, the dynamic moving averages and the envelopes; and
   (g) controlling the physical process according to the relative behaviors of the moving averages, the dynamic moving averages and the envelopes.

2. The method of claim 1, wherein the determining step includes selectively displaying the input set, the moving averages, the dynamic moving averages and the envelopes.

3. The method of claim 1, wherein step (d) includes computing a plurality of envelopes, the envelopes being mutually related by the predetermined ratio.

4. The method of claim 1, wherein the predetermined ratio is the Fibonacci factor.

5. The method of claim 1, wherein the physical process is a market, the values of the two parameters are market prices and times, and the acting step comprises trading in the market.

6. A method of controlling a physical process comprising the steps of:
   (a) measuring the values of two parameters having a functional relationship;
   (b) entering into a computer initial data comprising the set of measured values for each of said two parameters, said computer having a display and said sets defining a curve displaying the functional relationship between the two parameters if represented graphically;
   (c) producing with said computer a signal representing a moving average of said curve over a selected range of one of said parameters;
   (d) calculating with said computer the displacement between said curve and said moving average signal to produce an oscillator signal;
   (e) producing with said computer a signal representing an average of said oscillator signal over said selected range of said one parameter;
   (f) adding with said computer said oscillator average signal to said moving average signal to produce a signal representing a first dynamic moving average;
   (g) producing with said computer a plurality of signals representing averages of said oscillator signal over a respective plurality of shorter ranges of said one parameter to produce a series of signals representing dynamic moving averages, said shorter ranges being related to one another and to said selected range by a predetermined ratio;

(h) determining with said computer the maximum deviation of said curve from said moving average signal, said first dynamic moving average signal and said series of dynamic moving average signals;

(i) generating with said computer using the maximum deviation a signal representing a first envelope, said first envelope signal having an upper band and a lower band, said upper band having a value at each point in said selected range that is the sum of said maximum deviation and the value of the lowest of said moving average signal, said first dynamic moving average signal and said series of dynamic moving average signals at that point, and said lower band having a value at each point in said selected range that is the difference of said maximum deviation and the value of the highest of said moving average signal, said first dynamic moving average signal and said series of dynamic average signals at that point;

(j) generating with said computer a plurality of signals representing a plurality of inner and outer envelopes by repeating the foregoing step (i) using values of said maximum deviation related thereto by said predetermined ratio and multiples thereof;

(k) repeating the foregoing steps (c) through (j) in sequence using a plurality of ranges for said moving average signal, each of said plurality of ranges being related to said selected range by said predetermined ratio or a multiple thereof;

(l) storing in said computer data representing said moving average signal, said first dynamic moving average signal, said series of dynamic moving average signals, said first envelope signal and said plurality of other envelope signals;

(m) systematically repeating the foregoing step (l) according to said predetermined ratio and multiples thereof and storing in said computer the data generated thereby; and (n) selectively displaying said initial data, said first dynamic moving average signal, said series of dynamic moving average signals, said first envelope signal, and said plurality of other envelope signals; and (o) controlling the physical process according to the displayed first dynamic moving average signal, series of dynamic moving average signals, first envelope signal, and plurality of other envelope signals.

7. The method of claim 6, wherein said predetermined ratio is the Fibonacci factor and said one parameter is time and the other parameter is a market price.

* * * * *

UNITED STATES PATENT AND TRADEMARK OFFICE
CERTIFICATE OF CORRECTION

PATENT NO. : 5,241,461

DATED : August 31, 1993

INVENTOR(S) : Bradford J. Georges

It is certified that error appears in the above-identified patent and that said Letters Patent is hereby corrected as shown below:

Column 1, lines 25 and 26 - delete [commodity and currency] and insert --commodities and currencies-- therefor.

Column 2, line 6 - delete [affect] and insert --affects-- therefor.

Column 2, line 54 - delete [quick] and insert --quickly-- therefor.

Column 3, line 7 - insert --provides-- between "and" and "a".

Column 3, line 47 - delete [dynmamic] and insert --dynamic-- therefor.

Column 3, line 59 - delete [evelopes] and insert --envelopes-- therefor.

Column 6, line 19 - delete [Dutsche] and insert --Deutsche-- therefor.

Column 7, line 56 - delete [onto] and insert -- on to-- therefor.

Column 8, line 6 - delete [set] and insert -- = -- therefor.

Column 8, line 12 - delete [onto] and insert -- on to-- therefor.

Column 8, line 32 - delete [Gibonacci] and insert --Fibonacci-- therefor.

Column 8, line 36 - delete [represeted] and insert --represented-- therefor.

Column 8, line 52 - delete [highes] and insert --highest-- therefor.

Column 9, line 44 - delete [commodity and currency] and insert --commodities and currencies-- therefor.

Column 10, line 11 - insert --to-- between "as" and "whether".

Column 10, line 19 - delete [print out].

UNITED STATES PATENT AND TRADEMARK OFFICE
CERTIFICATE OF CORRECTION

PATENT NO.  : 5,241,461

DATED       : August 31, 1993

INVENTOR(S) : Bradford J. Georges

It is certified that error appears in the above-identified patent and that said Letters Patent is hereby corrected as shown below:

Column 11, line 44 - delete [connectin] and insert --connection-- therefor.

Column 11, line 51 - delete [statin] and insert --station-- therefor.

Column 12, line 37 - delete [lower] and insert --tower-- therefor.

Column 13, line 50 - delete [should] and insert --could-- therefor.

Signed and Sealed this

Ninth Day of August, 1994

Attest:

BRUCE LEHMAN

Attesting Officer

Commissioner of Patents and Trademarks